US008407874B2

(12) United States Patent
Giberti

(10) Patent No.: US 8,407,874 B2

(45) Date of Patent: Apr. 2, 2013

(54) PULLING PLIERS METHOD AND APPARATUS

(75) Inventor: Mark Giberti, Henderson, NV (US)

(73) Assignee: Las Vegas Tool LLC, Henderson, NV (US)

( * ) Notice: Subject to any disclaimer, the term of this patent is extended or adjusted under 35 U.S.C. 154(b) by 0 days.

(21) Appl. No.: 12/890,025

(22) Filed: Sep. 24, 2010

(65) Prior Publication Data

US 2012/0073101 A1 Mar. 29, 2012

(51) Int. Cl.

| | |
|---|---|
| ***B23P 19/04*** | (2006.01) |
| ***B23P 11/00*** | (2006.01) |
| ***B25B 7/12*** | (2006.01) |
| ***B25B 7/02*** | (2006.01) |
| ***B25C 11/00*** | (2006.01) |
| ***B66F 15/00*** | (2006.01) |

(52) U.S. Cl. ........... 29/254; 29/243.56; 81/367; 81/418; 254/18

(58) Field of Classification Search .................... 29/254, 29/243.56; 254/18; 81/367, 418, 463; D8/89
See application file for complete search history.

(56) References Cited

U.S. PATENT DOCUMENTS

| | | | | |
|---|---|---|---|---|
| 3,688,380 | A * | 9/1972 | Hofmann et al. | 29/243.56 |
| 3,791,012 | A * | 2/1974 | Jenkin | 29/254 |
| 4,307,635 | A * | 12/1981 | Genova | 81/463 |
| 4,669,341 | A * | 6/1987 | Small | 81/418 |
| 4,709,601 | A * | 12/1987 | Petersen | 81/367 |
| 4,730,524 | A * | 3/1988 | Petersen | 81/367 |
| 5,984,272 | A * | 11/1999 | Crider | 254/18 |
| D531,002 | S * | 10/2006 | L'Ecuyer et al. | D8/89 |
| 7,168,144 | B1 * | 1/2007 | Haelle | 29/254 |

OTHER PUBLICATIONS

Steck Innovative Autobody Tools and Equipment; http://www.steckmfg.com/20085_EZPullPliers.html; 2010.

* cited by examiner

*Primary Examiner* — Lee D Wilson
*Assistant Examiner* — Alvin Grant
(74) *Attorney, Agent, or Firm* — Baker Hostetler LLP

(57) ABSTRACT

Pulling pliers are provided. The pulling pliers include a pair of pliers having a set of jaws; and an attaching point connected to a jaw of the pliers for attaching a slide hammer mechanism. A method for pulling using pulling pliers is provided. The method includes gripping an object with the pliers; locking the pliers in a gripping position; and actuating a slide hammer attached to the pliers.

20 Claims, 4 Drawing Sheets

PULLING PLIERS METHOD AND APPARATUS

FIELD OF THE INVENTION

The present invention relates generally to a hand tool used for pulling objects. More particularly, the present invention relates to locking pliers having a slide hammer attached and configured to be used for pulling objects.

BACKGROUND OF THE INVENTION

Tools are desired for pulling objects such as friction fit pins out of metal objects such as, for example, automotive engine parts, nails out of wood or any other object needing to be pulled. Pulling nails traditionally has been done with a prying tool such as a crowbar or the claw on the back of a claw hammer. Crowbars and claw hammers often leave prying marks or other marks on wood or other finished surfaces from which the nails are pulled.

While pry bars may be useful for pulling nails, other objects are not usually pulled by the use of a pry bar. For example, friction fit pins or bolts maybe be difficult to remove due to corrosion or rust. Further, they may not provide a surface for a claw or crowbar to attach to pull the object. In such instances another type of pulling tool may be desired.

Accordingly, it is desirable to provide a tool that can be used to pull objects that may not lend themselves to being pulled with a hammer claw or crowbar and that does not leave marks on finished surfaces.

SUMMARY OF THE INVENTION

The foregoing needs are met, to a great extent, by the present invention, wherein in one aspect an apparatus is provided that in some embodiments a tool is provided that can pull objects that do not lend themselves to be pulled with a hammer claw or crowbar and does not leave marks on a finished surface from which the object is pulled.

In accordance with one embodiment of the present invention, pulling pliers are provided. The pulling pliers include a pair of pliers having a set of jaws; and an attaching point connected to a jaw of the pliers for attaching a slide hammer mechanism.

In accordance with another embodiment of the present invention, a pulling tool is provided. The pulling tool includes; a means for gripping, a means actuating the means for gripping, and a means for hammering attached to the gripping means.

In accordance with yet another embodiment of the present invention, a method for pulling using pulling pliers is provided. The method includes gripping an object with the pliers; locking the pliers in a gripping position; and actuating a slide hammer attached to the pliers.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
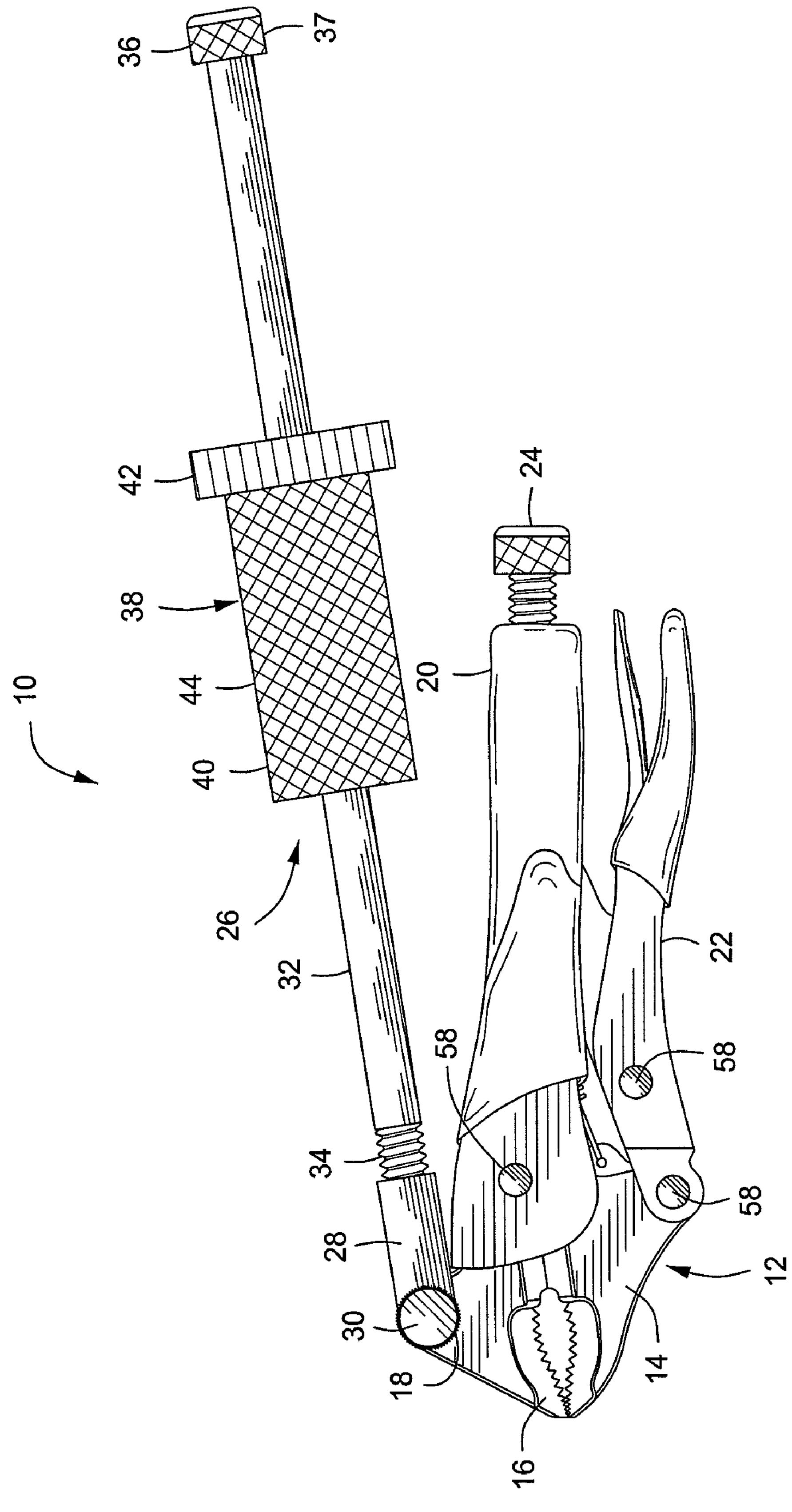
FIG. 1 is a side view illustrating a pulling tool in accordance with an embodiment of the invention.

The invention will now be described with reference to the drawing figures, in which like reference numerals refer to like parts throughout. An embodiment in accordance with the present invention provides a pulling tool which may also be referred to as pulling pliers 10.

As shown in FIG. 1 the pulling tool 10 includes a pair of locking pliers 12. The locking pliers 12 includes a lower jaw 14 and an upper jaw 16. The locking pliers 12 also include an attaching point or boss 18 (best shown in FIG. 2). The locking pliers 12 include an upper handle 20 and a lower handle 22. As is typically found on locking pliers 12, the upper handle 20 is equipped with an adjusting knob 24. The upper 20 and lower 22 handles of the pulling plies 10 may be coated with a resilient coating such as a plastic or rubber coating.

Further features and functions of the locking pliers 12 will not be further discussed as typical locking pliers 12 are well known and (with the exception of the attaching point or boss 18 which is new and in accordance with some embodiments of the invention) maybe used in accordance with the invention.

In accordance with some of the embodiments of the invention, the pulling pliers 10 are equipped with a slide hammer mechanism 26. The slide hammer mechanism 26 attaches to the lock pliers 12 via a coupler 28. The coupler 28 attaches to the locking pliers 12 by a bolt 30.

A long bolt or rod 32 is attached to the coupler 28 with threads 34 interlocking with interior threads to the coupler 28. The rod 32 at an end opposite of the threads 30 is equipped with a head 36. According to some embodiments of the invention the head 36 may be round or it may be hexed shaped. The head 36 may also have a knurled surface 37 to facilitate turning of the head 36 and rod 32 by hand. Turning the head 36 or rod 32 will remove or attach the rod 32 to the coupler 28.

A slide hammer 38 is located on the rod 32. The slide hammer 38 is able to slide along the rod 32 between the coupler 28 and the head 36. The slide hammer 38 is comprised of a cylinder 40. The cylinder 40 maybe made of mild steel. According to some embodiments of the invention, other materials may also be used. The slide hammer 38 may also include a hand stop 42. The hand stop 42 may have a larger diameter than the cylinder 40.

The larger diameter of the hand stop 42 allows a user's hand gripping the cylinder 40 to be less likely to slip along the cylinder 40 past the hand stop 42 and get pinched between the hammer 38 and the head 36 when a user activates the hammer mechanism 26 by sliding the hammer 38 along the rod 32 to ram the slide hammer 38 against the head 36. In some embodiments of the invention the cylinder 40 and/or the hand stop 42 maybe coated with a resilient coating. In some embodiments the resilient coating may be rubber. Other substances such as plastic may also be used. The resilient coating of the hammer 38 may be the same or similar resilient coating of the handles 20 and 22.

Figure 2:
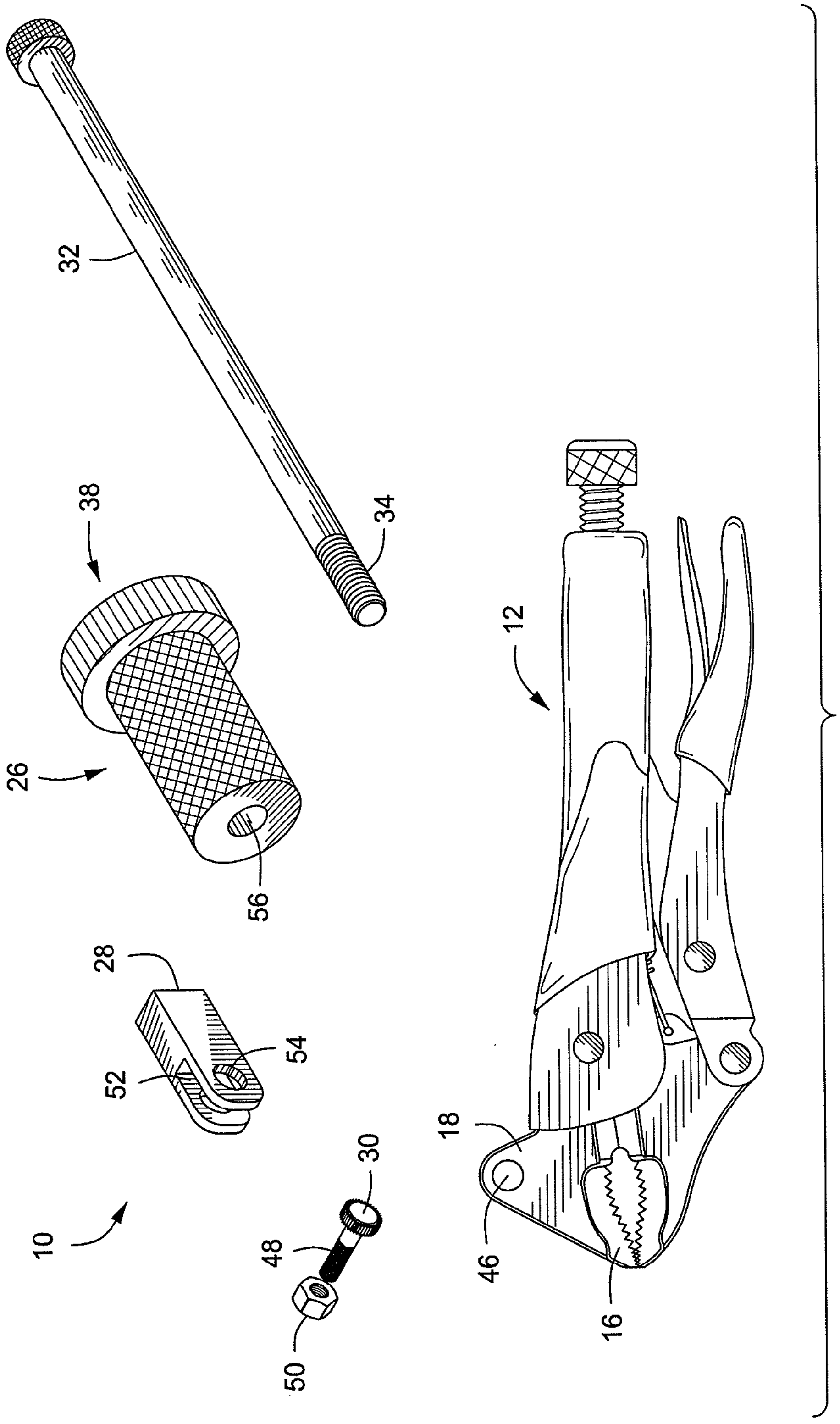
FIG. 2 is a disassembled view of the pulling tool shown in FIG. 1.

FIG. 2 shows a disassembled view of the locking pliers 10 shown in FIG. 1. FIG. 2 illustrates the hole 46 located in the boss 18. FIG. 2 also illustrates the threads 40 located on the bolt 30. The threads 48 are used to attach a nut 50 to the bolt 30. FIG. 2 also shows the slot 52 located in the coupler 28. The hole 54 in the coupler 28 is also shown. When the pulling pliers 10 are in the assembled condition, the slot 52 and the coupler 28 are fitted over the boss 18 so that the boss 18 fits in the slot 52. The holes 54 in the coupler 28 are aligned with the hole 46 in the boss 18. Aligning the holes 54 in the coupler 28 with the hole 46 in the boss 18 allows the bolt 30 to be inserted into the holes 54 in the coupler 28 and at the same time the hole 48 in the boss 18 of the lock pliers 12. The bolt 30 is secured to the coupler 28 by the nut 50.

The threads 34 allow the rod 32 to attach to the coupler 28. According to some embodiments, before the rod 32 is attached to the coupler 28, the hammer 38 is fitted onto the rod 32 allowing the rod 32 to extend through the hole 56 and the hammer 38.

Figure 3:
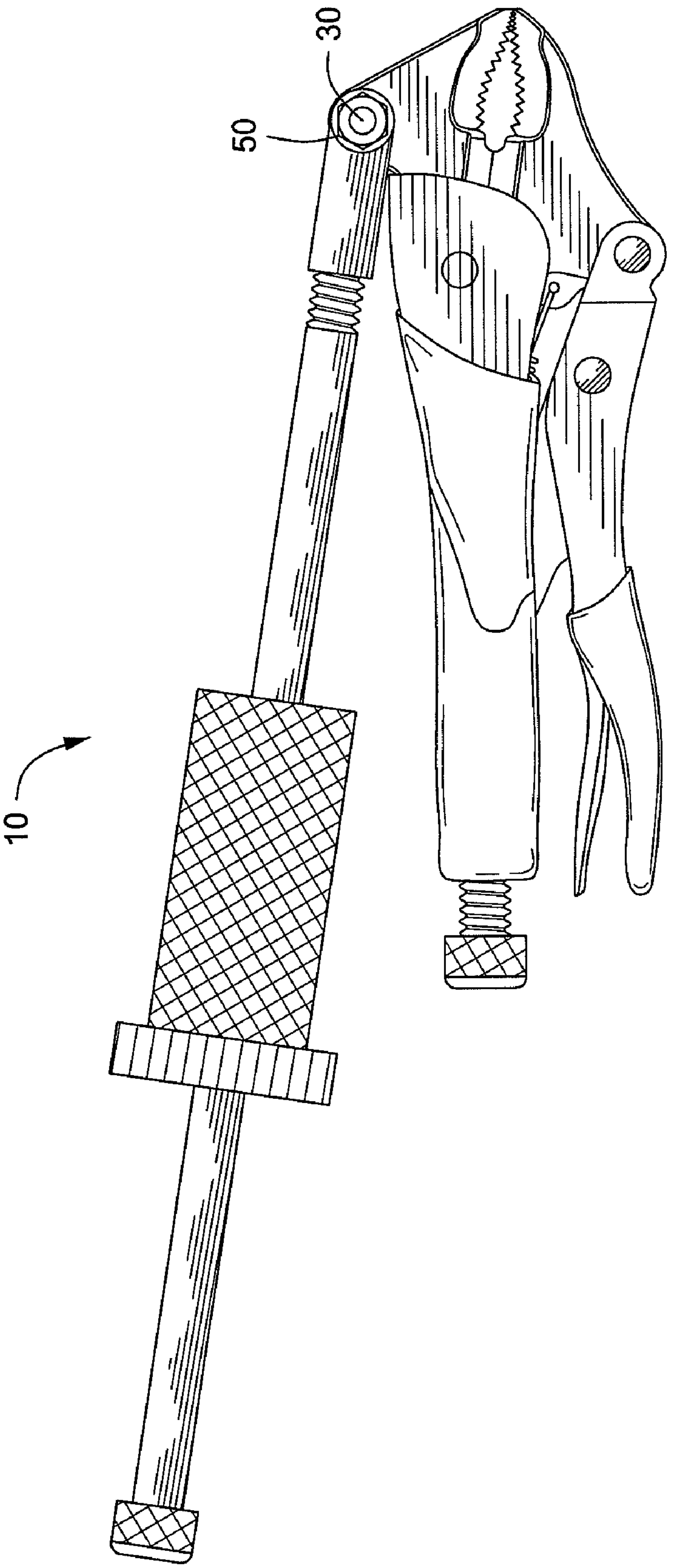
FIG. 3 is a side view of the pulling tool shown in FIG. 1 showing the opposite side of the pulling tool and that showing FIG. 1.

FIG. 3 shows the opposite side of the pulling pliers 10 shown in FIG. 1. As shown in FIG. 3, the nut 50 is attached to the bolt 30.

Figure 4:
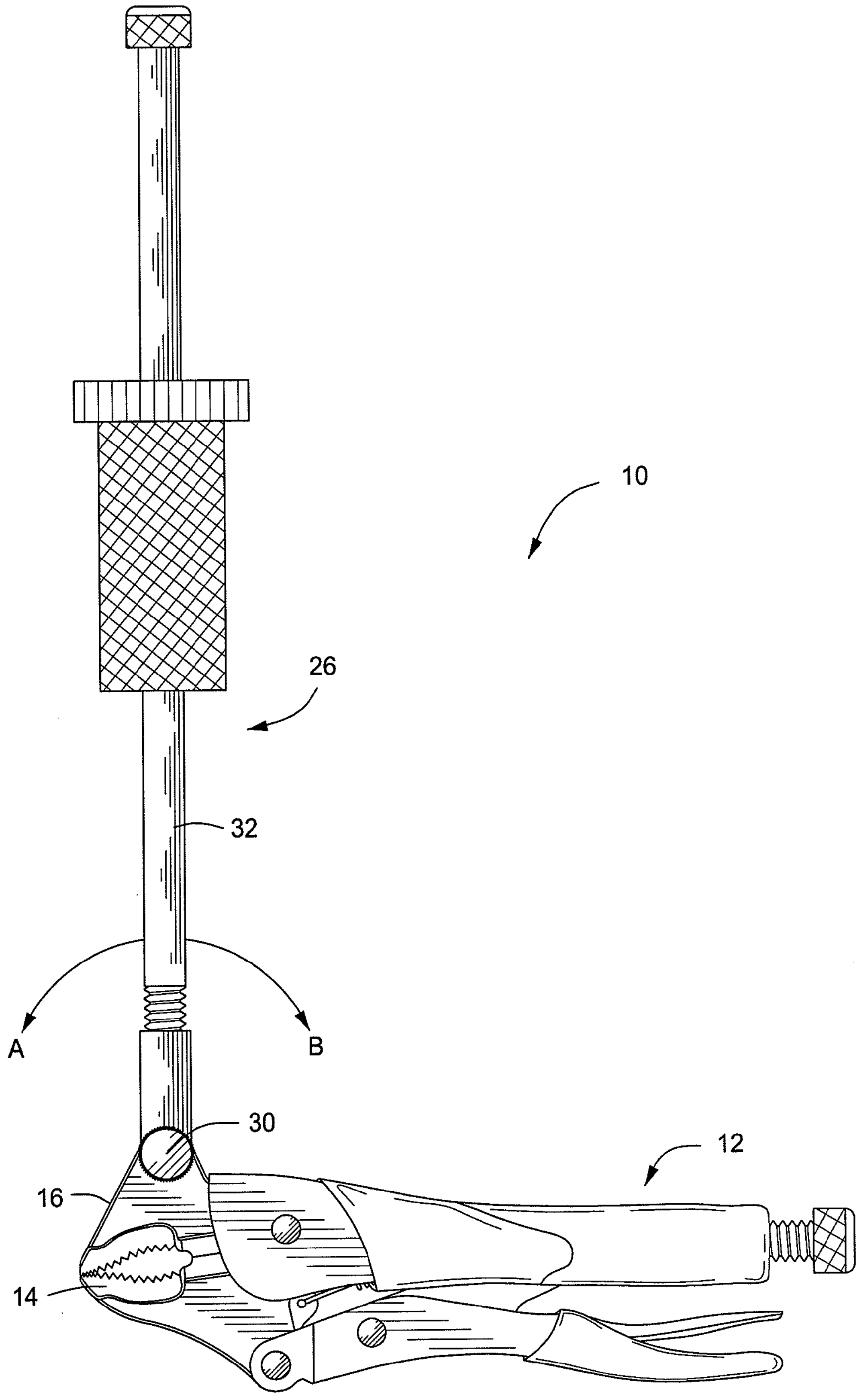
FIG. 4 is a side view of the pulling tool showing FIG. 1 showing a slide hammer pivoted to a different position than the position shown in FIG. 1.

As shown in FIG. 4, the slide hammer mechanism 26 is pivotedly attached by the bolt 30 to the lock pliers 12. Thus, the rod 32 can be pivoted in the direction of arrows A and B to a desired position.

A user can fit the jaws 14 and 16 over an item that is desired to be pulled. The jaws 14 and 16 may be locked onto the item to be pulled operating the lock pliers in a standard way. The user, at the user's discretion, can pivot the slide hammer mechanism 26 to allow the slide hammer mechanism 26 to exert an advantageous force on the lock pliers 12 when the hammer 38 is slammed against the bolt head 36 to apply a pulling force on the lock pliers 12. A user may select the position of the slide hammer mechanism 26 for a variety of reasons. For example, as mentioned above, the user may select a position of the slide hammer 26 to allow the slide hammer mechanism to pull on the lock pliers 12 at an advantageous angle with respect to the item being pulled in the jaws 14 and 16 of the lock pliers 12. Other considerations such as the space in which a user has to work may also be a factor in determining what angle a user decides to orient the hammer mechanism 26.

Some advantages may be achieved by attaching the side hammer mechanism 26 to a jaw 16 rather than some other portion of the lock pliers 12. For example, the pulling power of the lock pliers 12 may be increased and the dependability may also be increased because the force is directly applied to what is being pulled without having to be transferred through several weaker and adjustable parts within the lock pliers 12. Such as for example, the pins 58 (as shown in FIG. 1).

According to some embodiments the slide hammer mechanism 26 can be removed from the lock pliers 12 by either removing the rod bolt 32 and/or the bolt 30. Removal of the sliding hammer mechanism 26 allows the lock pliers to be easily stored in a small area. It also allows the lock pliers 12 to be used as standard locking pliers.

In other embodiments of the invention the pulling pliers 12 may be equipped with several different rod bolts 32 of different lengths. A user may select a desired length of rod bolt 32 and switch out rod bolt 32 having a desired length for a particular task. Various components of the tool maybe be hardened as needed, for example, the coupler 28 maybe made of hardened steel.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. Pulling pliers comprising:

A pair of pliers having a set of jaws and an attaching point that is not in parallel alignment with said jaw surface of the pliers and a pivoting coupler for attaching a slide hammer mechanism the attaching point located at a position to permit the slide hammer to pivot with respect to the jaw.

2. The pliers of claim 1, wherein the attaching point is located on a boss located on the top jaw of the pliers above a plane defined by an upper handle of the pliers.

3. The pliers of claim 1, wherein the pliers are locking pliers.

4. The pliers of claim 1, further comprising a slide hammer mechanism attached to the attaching point of the pliers.

5. The pliers of claim 4, further comprising a removable connector connects the slide hammer mechanism to the attaching point.

6. The pliers of claim 4, wherein the slide hammer mechanism is pivotally connected to the attaching point and the attaching point is located remotely from an upper handle to permit a user's hand to grip the upper handle and a lower handle of the pliers.

7. The pliers of claim 4, wherein the slide hammer mechanism includes a slideable hammer and the slideable hammer is coated, at least in part, with a resilient coating.

8. The pliers of claim 4, wherein the slide hammer mechanism includes:

a connector pivotally attached to the attaching point;

a rod along with a slide hammer configured to slide along the rod, the rod attached by threads to the connector; and a stop located at an opposite end of the rod than an end of the rod attached to the connector.

9. The pliers of claim 8, wherein the stop is a hardened steel bolt head.

10. The pliers of claim 8, wherein the stop has a knurled outer surface.

11. The pliers of claim 8, further comprising additional rods of various lengths having threads that are configured to attach to the connector.

12. The pliers of claim 11, further comprising slide hammers of various sizes configured to slide along the additional rods.

13. The pliers of claim 8, wherein the connector is equipped with a slot dimensioned to allow structure defining the attaching point to fit into the slot.

14. The pliers of claim 8, wherein the connector is equipped with a hole that is configured to align with a corresponding hole in structure defining the attaching point and a fastener connects the connector to the attaching point by extending through the holes in the connector and the structure defining the attaching point.

15. The pliers of claim 14, wherein the connector is hardened steel.

16. The pliers of claim 8, further including a hand stop attached to the slide hammer, the hand stop having a larger diameter than the slide hammer.

17. A pulling tool comprising:

a means for gripping;

a means actuating the means for gripping; and a means for hammering attached to the gripping means via a pivoting means for coupling wherein the means for hammering is attached to the means for gripping at a position configured to allow the means for hammering to pivot with respect to the jaw.

18. The pulling tool of claim 17, wherein the means for hammering is pivotally attached to the means for gripping.

19. A method for pulling using pulling pliers comprising;

gripping an object with the pliers;

locking the pliers in a gripping position; and actuating a slide hammer attached to the pliers while gripping an upper and lower handle on the pliers to strike a pivoting coupler to transfer a force to the pliers at a desired direction.

20. The method of claim 19, further comprising rotating the slide hammer to a desired angle with respect to the pliers.

* * * * *